US010414939B2

(12) United States Patent
Iu et al.

(10) Patent No.: US 10,414,939 B2
(45) Date of Patent: Sep. 17, 2019

(54) OPTICALLY CLEAR FLUID COMPOSITION

(75) Inventors: Kai-Kong Iu, San Diego, CA (US); Zeying Ma, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 912 days.

(21) Appl. No.: 14/404,239

(22) PCT Filed: Jul. 31, 2012

(86) PCT No.: PCT/US2012/048964
§ 371 (c)(1),
(2), (4) Date: Nov. 26, 2014

(87) PCT Pub. No.: WO2014/021840
PCT Pub. Date: Feb. 6, 2014

(65) Prior Publication Data
US 2015/0152281 A1 Jun. 4, 2015

(51) Int. Cl.
*C09D 133/00* (2006.01)
*C09D 11/30* (2014.01)
(52) U.S. Cl.
CPC ............ *C09D 133/00* (2013.01); *C09D 11/30* (2013.01); *Y10T 428/24876* (2015.01)
(58) Field of Classification Search
CPC .............................. C09D 11/30; C09D 133/00
See application file for complete search history.

(56) References Cited

U.S. PATENT DOCUMENTS

| 4,303,696 | A | * | 12/1981 | Brack | C08F 283/04 427/503 |
| 4,529,641 | A | * | 7/1985 | Holtrop | B32B 5/32 428/198 |
| 5,098,955 | A | | 3/1992 | Pettit, Jr. | |
| 5,723,276 | A | | 3/1998 | Shaw-Klein et al. | |
| 6,475,712 | B1 | * | 11/2002 | Wang | G03C 1/7614 430/496 |

(Continued)

FOREIGN PATENT DOCUMENTS

| WO | WO-2012/087331 | 6/2012 |
| WO | WO 2012/087331 | 6/2012 |

OTHER PUBLICATIONS

Joncryl 77 data sheet from BASF (Obtained Aug. 16, 2017).*

(Continued)

*Primary Examiner* — Scott R. Walshon
*Assistant Examiner* — Sathavaram I Reddy
(74) *Attorney, Agent, or Firm* — Dierker & Kavanaugh PC

(57) ABSTRACT

Examples of optically clear fluid compositions are disclosed herein. In one example, the optically clear fluid composition includes an aqueous vehicle, an anionic polymeric binder dispersed in the aqueous vehicle, and wax particles incorporated in the aqueous vehicle. The anionic polymeric binder has a glass transition temperature ($T_g$) that is higher than 40 C, and a pH ranging from about 7 to about 11. The wax particles have a particle size ranging from about 25 nm to about 75 nm, and a melting temperature ($T_m$) ranging from about 100 C to about 150° C. The optically clear fluid composition has a viscosity ranging from about 0.5 centipoise to about 90 centipoise.

20 Claims, 2 Drawing Sheets

(56) References Cited

U.S. PATENT DOCUMENTS

| | | | |
|---|---|---|---|
| 6,475,715 B2 | 11/2002 | Wang et al. | |
| 6,638,585 B2 | 10/2003 | Niu et al. | |
| 7,608,312 B1 * | 10/2009 | Edlein | B41M 5/52 |
| | | | 250/492.3 |
| 8,067,142 B2 | 11/2011 | Halfyard et al. | |
| 2004/0091645 A1 | 5/2004 | Heederik et al. | |
| 2005/0118359 A1 | 6/2005 | Sen | |
| 2005/0206703 A1 * | 9/2005 | Guo | C09D 11/30 |
| | | | 347/100 |
| 2005/0243121 A1 * | 11/2005 | Onishi | B41J 2/2114 |
| | | | 347/21 |
| 2007/0120928 A1 * | 5/2007 | Ma | C09D 11/38 |
| | | | 347/100 |
| 2007/0237910 A1 | 10/2007 | Zhou et al. | |
| 2009/0017234 A1 | 1/2009 | Song et al. | |
| 2009/0139891 A1 | 6/2009 | Oshima et al. | |
| 2009/0246479 A1 | 10/2009 | Mukai et al. | |
| 2010/0086692 A1 | 4/2010 | Ohta | |
| 2011/0234682 A1 | 9/2011 | Ohta et al. | |
| 2012/0149803 A1 | 6/2012 | Straub et al. | |
| 2012/0176455 A1 * | 7/2012 | Ohta | B41M 5/0011 |
| | | | 347/102 |
| 2013/0330526 A1 * | 12/2013 | Song | C09D 5/024 |
| | | | 428/205 |
| 2014/0015894 A1 * | 1/2014 | Sisler | C09D 133/10 |
| | | | 347/20 |

OTHER PUBLICATIONS

Joncryl Wax 26 data sheet from BASF (Obtained Aug. 16, 2017).*
Anionic and Cationic Water Based Emulsions from Gellner Industrial LLC (Obtained Aug. 16, 2017).*
Joncryl 89 data sheet by BASF (Obtained Aug. 2, 2018).*

* cited by examiner

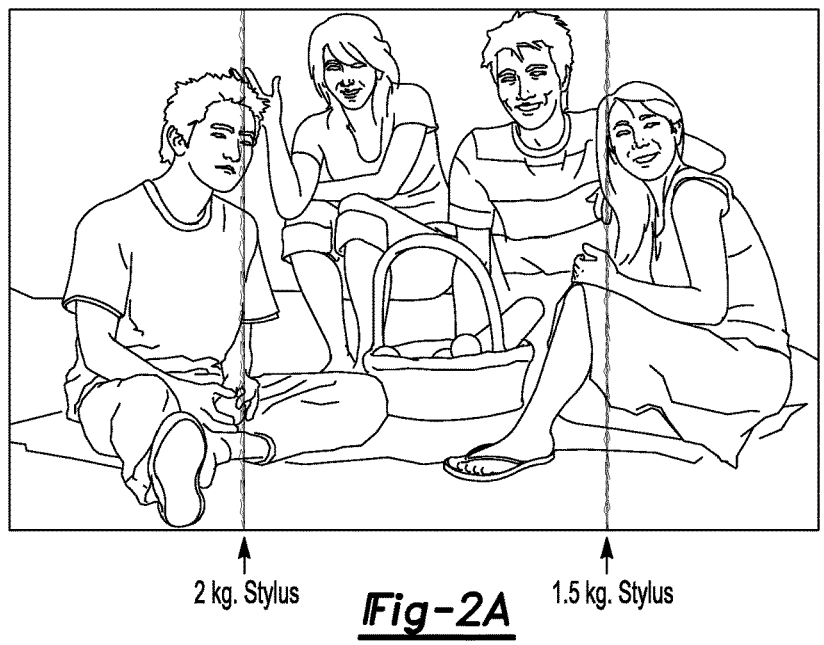
2 kg. Stylus    *Fig-2A*    1.5 kg. Stylus
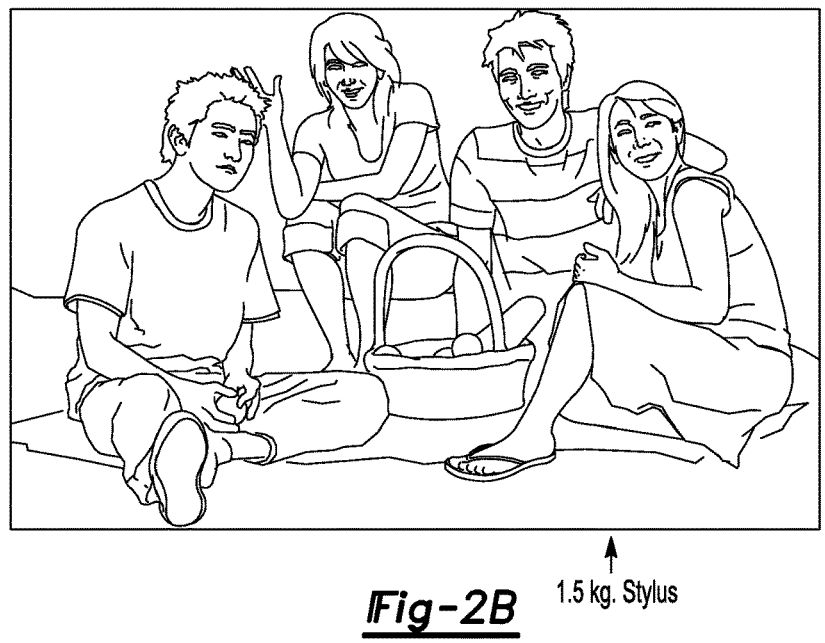
*Fig-2B*    1.5 kg. Stylus
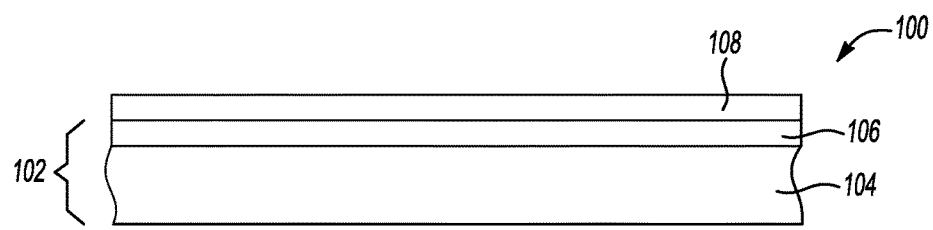
*Fig-3*

OPTICALLY CLEAR FLUID COMPOSITION

BACKGROUND

Inkjet printing systems may be used to effectively produce images on a medium. In general, inkjet printing involves ejecting ink droplets from a nozzle at high speed onto the medium to produce an image. The image may include photos, graphics, and/or text.

In some instances, it may be desirable to apply a clear coating composition over the ink that was ejected onto the medium, for example, to improve one or more characteristics of the image. Examples of these characteristics may include print quality, gloss, scratch resistance, rub resistance, and/or the like.

BRIEF DESCRIPTION OF THE DRAWINGS

Features and advantages of examples of the present disclosure will become apparent by reference to the following detailed description and drawings.

FIG. 2A is a representation of an image of a product formed by depositing an ink on a recording medium, where the product was exposed to scratch resistance tests;

FIG. 2B is a representation of an image of a product formed by depositing an ink on a recording medium, and then depositing an optically clear fluid composition, according to an example of the present disclosure, on the ink, where the solid-based components of the fluid composition include a polymeric binder having a $T_g$ of about 98° C. and wax particles, and where the product was exposed to scratch resistance tests; and FIG. 3 schematically depicts an example of a printed article.

DETAILED DESCRIPTION

Figure 1A:
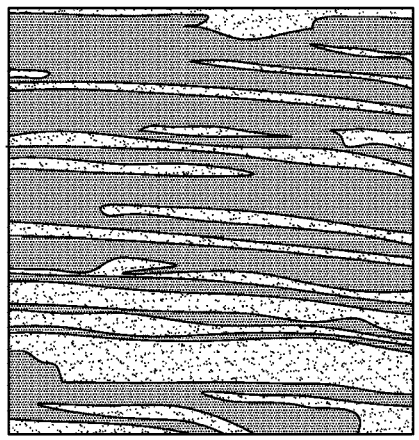
FIG. 1A is a representation of an image of a product formed by depositing an ink on a recording medium, where the product was exposed to 10 cycles of dry rubbing.

The present disclosure relates generally to optically clear fluid compositions. The examples of the optically clear fluid composition as disclosed herein are formulated to be applied on a print. As used herein, a "print" is a medium upon which an ink has been applied/deposited/etc. to form an image (e.g., a photo, a graphic, text, etc.). The inventors of the present disclosure have found that prints having the optically clear fluid composition (referred to hereinbelow as the "fluid composition") applied thereon exhibit improved durability, at least in terms of rub resistance. Further, some examples of the fluid composition are jettable from any inkjet printhead (e.g., a thermal inkjet printhead, a piezoelectric inkjet printhead, etc.), and as such, these examples of the fluid composition may be applied onto a print using an inkjet printing device. Other examples of the fluid composition (e.g., those having a polymer content that is greater than 20 wt % of the total wt % of the fluid composition) may be applied onto a print by a post processing device, e.g., by a roll coater.

The examples of the fluid composition are considered to be optically clear so as not to deleteriously affect the visibility (e.g., in terms of clarity, sharpness, color, and/or the like) of an underlying image formed on the medium. As used herein, a composition that is "optically clear" is one that is optically transparent to visible light. In an example, a fluid composition that is "optically clear" is one that exhibits at least 90% light transmission at 400 nm wavelength light. In another example, a fluid composition that is "optically clear", when applied on a print (e.g., on the ink or the image), produces a product that exhibits minimal haze, if any. As such, the optically clear fluid composition may be considered to be completely clear. In an example, the increase in the Log Haze of a print coated with an example of the fluid composition disclosed herein as compared to an uncoated print is less than 100 Log Haze units. For instance, when an uncoated print has a Log Haze of 350 Log Haze units, a print coated with an example of the fluid composition disclosed herein will have a Log Haze of no greater than 450 Log Haze units.

Examples of the fluid composition will now be described herein. It to be understood that these examples are water-based fluid compositions, and thus include an aqueous vehicle. It is to be understood that by the term "water-based", it is meant that none of the fluid compositions contain hydrocarbons (e.g., oils). As used herein, the term "aqueous vehicle" refers to a carrier fluid that includes at least water. In some instances, the aqueous vehicle includes one or more additives that are added to the carrier fluid. The "carrier fluid" is the liquid-based medium constituting the bulk of the vehicle, and this liquid-based medium is used to transport solid-based components of the fluid composition through a printer during printing or through another device during post processing. The solid-based components of the fluid composition (e.g., resins, polymeric binders, and wax particles) are water-dispersible, and thus are dispersed in the aqueous vehicle.

In one example, the carrier fluid is water by itself. In another example, the carrier fluid includes water and one or more water-soluble organic solvents and/or co-solvents. It is to be understood that each organic solvent and/or co-solvent, if used, individually contributes to the performance of the whole vehicle.

Some examples of suitable organic solvents include polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, 2-pyrrolidone, n-methyl-2-pyrrolidone, 1,3-dimethylimidazolidinone, triethanolamine, sulfolane, dimethyl sulfoxide, and/or combinations thereof.

The water-soluble organic solvent(s) may also be chosen from other amines, ketones, ethers (e.g., glycerol ether such as polyethoxylated ether or glycerol and glycereth-26 (commercially available as LIPONIC® EG 1 (LEG-1) from Lipo Chemicals), polyalkylene glycols, alkylene glycols, lower alkyl ethers of polyhydric alcohols, monohydric alcohols, and/or combinations thereof. In an example, the solvent(s)/co-solvent(s) is/are chosen from thiodiglycol, hexylene glycol, diethylene glycol, ethylene glycol methyl ether, diethylene glycol monomethyl ether, triethylene glycol monomethyl ether, glycerol, 2-pyrrolidone, LEG-1, polyalkylene glycols, alkylene glycols, and combinations thereof.

In an example, one or more of the solvents/co-solvents is/are a humectant, which is generally used, e.g., to enhance the longevity of the fluid composition (e.g., by preventing the fluid composition from drying out). The humectant(s) may also be used to enhance the solubility characteristics of the fluid composition, which may be maintained by retaining the moisture within the aqueous vehicle. Some examples of humectants that may be used in the aqueous vehicle include nitrogen-containing compounds (such as urea, thiourea, ethylene urea, alkylurea, alkylthiourea, dialkylurea, and dialylthiourea), sugars (such as 1-deoxy-D-galactitol, mannitol, and inositol), polyols (e.g., diols and triols), heterocyclic ketones (such as 2-pyrrolidone and hydantoin glycol (such as DANTOCOL® DHE (Di-(2-Hydroxyethyl)-5, 5-Dimethylhydantoin, Lonza Group, Ltd., Switzerland)), and/or combinations thereof.

The solvent(s)/co-solvent(s)/humectant(s), if used, is/are present in the fluid composition in an amount ranging from about 2 wt % to about 30 wt % of a total wt % of the fluid composition. In another example, the solvent(s)/co-solvent(s)/humectant(s), if used, is/are present in the fluid composition in an amount ranging from about 6 wt % to about 20 wt % of the total wt % of the fluid composition. In yet another example, the solvent(s)/co-solvent(s)/humectant(s), if used, is/are present in the fluid composition in an amount ranging from about 7 wt % to about 15 wt % of the total wt % of the fluid composition.

As previously mentioned, the aqueous vehicle may include one or more additives. As one example, the additive may be chosen from one or more surfactants. The surfactant(s) may be chosen from ionic surfactants, non-ionic surfactants, and combinations thereof. Some examples of surfactant(s) that may be used include primary, secondary, and tertiary amine salt compounds (such as hydrochloric acid salts, acetic acid salts of laurylamine, coconut amine, stearylamine, and rosin amine), quaternary ammonium salt compounds (such as lauryltrimethylammonium chloride, cetyltrimethylammonium chloride, benzyltributylammonium chloride, and benzalkonium chloride), pyridinium salt compounds (such as cetylpyridinium chloride and cetylpyridinium bromide), polyoxyethylene alkyl ethers, polyoxyethylene alkyl esters, acetylene alcohols, acetylene glycols, 2-heptadecenyl-hydroxyethylimidazoline, dihydroxyethylstearylamine, stearyldimethylbetaine, lauryldihydroxyethylbetaine, alkylphenylethoxylate (such as, e.g., SURFYNOL® CT-211, Air Products and Chemicals, Inc., Allentown, Pa.), and combinations thereof. The surfactant may also or otherwise be chosen from fluorosurfactants such as e.g., ZONYL® FSO (E.I. DuPont de Nemours % Co., Inc., Wilmington, Del.). In an example, the surfactant(s) is/are chosen from acetic acid salts of laurylamine, polyoxyethylene alkyl esters, acetylene alcohols, alkylphenylethoxylate, fluorosurfactants, and combinations thereof.

The surfactant(s), if used, is/are present in the fluid composition in an amount ranging, for example, from about 0.01 wt % to about 2.5 wt % of the fluid composition. In another example, the surfactant(s), if used, is/are present in the fluid composition in an amount ranging from about 0.1 wt % to about 1 wt % of the total wt % of the fluid composition. In yet another example, the surfactant(s), if used, is/are present in the fluid composition in an amount ranging from about 0.2 wt % to about 0.9 wt % of the total wt % of the fluid composition. Furthermore, it is to be understood that one or more of the solid-based components of the fluid composition (e.g., the as-purchased polymeric binder) may include a surfactant (e.g., in the polymer concentrate), e.g., for wetting purposes. In these instances, the total amount of the surfactant(s) to be incorporated into the fluid composition may be reduced to account for the additional surfactant in the polymer concentrate (i.e., binder(s)).

In an example, the amount of the surfactant in the polymer concentrate ranges from about 0.9 wt % to about 3.0 wt % of the total wt % of the concentrate. The amount of surfactant present in the fluid composition (which includes the polymer concentrate having surfactant therein) may be reduced by at least 0.01 wt %. In another example in which some surfactant is included in the polymer concentrate (i.e., binder) that is added to the fluid composition, the amount of additional surfactant added to the fluid composition may be reduced by an amount ranging from about 0.1 wt % to about 1.0 wt %. It is to be understood that the amount of additional surfactant to be added to the fluid composition (when the polymer concentrate (i.e., the binder) includes some surfactant) is based, at least in part, on a desired performance of the fluid composition when the fluid composition is applied onto a print.

In an example, a biocide may be added to the aqueous vehicle as an additive, and may be used to inhibit the growth of potentially harmful microorganisms in the fluid composition. Thus, the term "biocide" may be used to describe both a biocide and a fungicide. Some examples of biocides include the biocides of the NEUSEPT® family (International Specialty Products, Wayne, N.J.), UCARCIDE™ (Mid South Chemical, Ringgold, La.), VANCIDE® (R.T. Vanderbilt Company, Inc., Norwalk, Conn.), PROXEL™ (Arch Chemicals, Norwalk, Conn.), and combinations thereof. In an example, the biocide is PROXEL™ GXL. The amount of the biocide(s) present in the fluid composition, if used, ranges, for example, from about 0.01 wt % to about 2 wt % of the total wt % of the fluid composition. In another example, the amount of the biocide(s), if used, ranges from about 0.05 wt % to about 1.5 wt %.

In an example, a pH adjuster may also be added to the aqueous vehicle as an additive to adjust the pH of the fluid composition so that the pH ranges from about 8 to about 9.5. In an example, nitric acid may be added in an amount as needed to lower the pH, and potassium hydroxide may be added in an amount as needed to raise the pH.

It is to be understood that the aqueous vehicle of the examples of the fluid composition disclosed herein is predominately made up of water, and as such, may be considered to be more environmentally friendly than other fluid compositions including vehicles that are predominately made up of, e.g., organic solvents. To enhance its environmental friendliness, in an example, one or more of the components of the aqueous vehicle may be replaced with a more environmentally friendly substitute. In an example, the environmentally friendly substitute has no, or a very low content of volatile organic compounds (VOCs) and does not adversely affect the ozone. For example, a fluorosurfactant having a carbon chain length that is greater than six carbons may be replaced by a per-fluorosurfactant having a carbon chain length of six carbons or less as a substitute component. By use of this, or another suitable substitute component, the fluid composition can meet perfluorooctanoic acid (PFOA) standards established by the United States Environmental Protection Agency. Examples of a per-fluorosurfactant having a carbon chain length of six carbons or less include fluorosurfactants of the MEGAFACE™ family (DIC Europe GMbH, Germany) and the POLYFOX™ family (OMNOVA, Fairlawn, Ohio).

It is further believed that, at the concentration of the solvent(s)/co-solvent(s) in the examples of the fluid composition, any of the solvent(s)/co-solvent(s) identified above are also considered to be environmentally friendly.

The inventors have found that improvement in print durability is achievable for a product formed by the application, on a print, of an example of the fluid composition containing environmentally friendly component(s). For instance, the inventors have found that the scratch resistance of a product produced by applying (on a print) a fluid composition including a MEGAFACE™ fluorosurfactant is about the same as the scratch resistance of another product produced by applying (on a print) a fluid composition including a ZONYL® fluorosurfactant.

As previously mentioned, the fluid composition further includes solid-based components that are dispersed in the aqueous vehicle. In other words, the solid-based components are water-dispersible. In an example, the solid-based components include a polymeric binder and wax particles. The inventors of the present disclosure have found that an unexpected improvement in print durability (e.g., in terms of rub resistance) of a product may be achieved when the fluid composition applied on a print includes the combination of i) an anionic polymeric binder having a high glass transition temperature ($T_g$) and ii) wax particles having a high melting temperature ($T_m$) and a small average particle size.

Specifically, the inventors expected products formed using the examples of the fluid composition to exhibit good resistance to scratching, and good resistance to rubbing (e.g., the product would exhibit rub resistance after 2 cycles of rubbing performed by a TMI Rub Tester Model No. 10-18-01-001 (Testing Machines, Inc., New Castle, Del.)). The inventors' expectation was based, at least in part, on the belief that a slippery surface would form on the print when the fluid composition was deposited thereon. However, the products formed when examples of the fluid composition were deposited on prints exhibited an improvement in rub resistance beyond the inventors' expectation. As shown in Example 1 below, a product formed by depositing an example of the fluid composition thereon exhibited resistance to rubbing after 10 cycles performed by the rub tester.

The inventors believe that the unexpected improvement in rub resistance may be due to the density of wax particles (which is about 0.99 g/mL) in the fluid composition relative to that of the polymeric binder (which is about 1.11 g/mL). In general, the density of the wax particles is lighter than that of water, while the density of the polymeric binder is heavier than that of water. As the water evaporates from the fluid composition, most of the wax particles will rise to the top of the water-based vehicle, while the polymeric binder will fall to the bottom of the water-based vehicle. It is believed that some of the wax particles may not rise to the top, at least in part, because of the higher loading of wax particles relative to polymeric binder in the fluid composition. Accordingly, when the fluid composition that is applied on a print dries, the polymeric binder will form a polymer film on the surface of the print. Some of the wax particles that rise to the top of the water-based solution during the evaporation of the water will sit (either individually or in clusters) on the upper side of the polymer film, while some of the wax rising particles will be embedded in the polymer film as a filler. Further, the wax particles that do not rise to the top of the water-based solution during water evaporation will either i) be embedded in the polymer film or ii) adhere to the under side of the polymer film; i.e., underneath the polymer film. It is to be understood that the wax particles will adhere to the polymer film due to the adhesive property of the polymer.

The inventors found that the wax particles sitting on the top of the polymer film impart a textured surface to the polymer film that is similar to an orange peel (i.e., an orange peel-like surface). It is believed that the wax particles sitting on the top surface is responsible, at least in part, for the unexpected improvement in durability of the product, e.g., in terms of rub resistance.

Details and examples of the polymeric binder and the wax particles are described hereinbelow.

As used herein, a polymeric binder having a "high $T_g$" is a polymeric binder that has a $T_g$ that is at least about 15° C. higher than room temperature. In an example where room temperature is about 23° C., the high $T_g$ is equal to or greater than 38° C. (i.e., 15° C. above 23° C.). In still another example, the high $T_g$ of the polymeric binder is equal to or greater than 40° C. In an example, the polymeric binder is chosen from one that has a $T_g$ ranging from about 40° C. to about 100° C. It is believed the fluid composition including a polymeric binder having a high $T_g$ will retain its toughness and/or durability when the fluid composition is exposed to elevated temperatures, e.g., the temperatures generated by the dryer of a printer at the printing zone. Drying temperatures are generally suitable for evaporating any water, and in some instances may be up to 120° C.

For inkjet printing, it is also desirable that the polymeric binder be chosen from one that has a number average molecular weight ranging, for example, from about 2,000 MW to about 200,000 MW. In another example, for inkjet printing, a number average molecular weight of the polymeric binder desirably ranges from about 2,000 MW to about 45,000 MW. In yet another example, for inkjet printing, a number average molecular weight of the polymeric binder desirably ranges from about 4,000 MW to about 35,000 MW. It is to be understood that for post processing (i.e., the fluid composition is applied using a technique other than inkjet printing), the fluid composition may include a higher molecular weight polymeric binder which will increase the viscosity of the fluid. In an example, the polymeric binder that is suitable for the examples of the fluid composition that are usable for post processing (e.g., roll coating) has a number average molecular weight that is higher than 200,000 MW.

The acid number of the polymeric binder generally impacts the solubility of the binder in the carrier fluid of the vehicle. Polymeric binders having a low acid number (e.g., lower than 10) are less soluble in the vehicle, while polymeric binders having a higher acid number (e.g., higher than 10) are more soluble in the vehicle. It is believed that polymeric binders having a low acid number may deleteriously affect inkjet printing of the fluid composition. For example, the use of low acid number polymeric binders may lead to kogation on the heating element of the printhead and/or relatively poor heat transfer, both of which deleteriously affect the reliability of the inkjet printhead. When the acid number of the polymeric binder is too high (e.g., higher than 200), the polymeric binder is so soluble that the fluid composition is not waterfast and may easily be washed away by the application of water. As such, it is further desirable that the polymeric binder has an acid number ranging, for example, from about 10 to about 200. In another example, the acid number of the polymeric binder ranges from about 40 to about 65. In still another example, the acid number of the polymeric binder ranges from about 50 to about 60.

It is believed that the polymeric binder and the vehicle selected may affect the characteristics of each other in the fluid composition. For example, the acid number may affect the solubility in a particular vehicle. As such, it is generally desirable that the fluid composition disclosed herein be made by balancing at least the type of polymeric binder (e.g., acrylic, urethane, etc.) with the acid number of the polymeric binder, the molecular weight of the polymeric binder, and the type of vehicle in order to achieve the desired results. The ranges provided herein are examples for selecting a suitable polymeric binder and vehicle, but it is believed that other ranges may also be suitable if the resulting fluid composition achieves desirable results. As an example, a urethane-containing polymeric binder may have a number average molecular weight ranging from about 4000 to about 35,000 and an acid number ranging from about 40 to about 65, and the vehicle may be water mixed with a pyrrolidone type solvent, e.g. 2-pyrrolidone and N-methylpyrrolidone.

The polymeric binder for the fluid composition, which has a high $T_g$, is an anionic polymeric binder. In an example, the high $T_g$, anionic polymeric binder has a pH that is greater than 7. In another example, the pH of the high $T_g$ polymeric binder ranges from about 7 to about 11. In yet another example, the pH of the high $T_g$ polymeric binder ranges from about 7.5 to about 10.8. It is believed that polymeric binders having a pH that is lower than 7 are incompatible with other components of a basic composition (i.e., a composition having a pH above 7). For instance, polymeric binders having a pH that is lower than 7 may become very viscous when incorporated into a basic composition. Also, polymeric binders having a pH that is lower than 7 may crash out of the basic composition, and settle to the bottom of the composition.

In an example, the high $T_g$, anionic polymeric binder is chosen from an acrylic polymer. Examples of the acrylic polymer include i) a carboxylic acid group and ii) a blend of vinyl aromatic compounds and esters of alpha, beta-ethylenically unsaturated acids. Examples of monomers containing the carboxylic acid group include acrylic acid, methacrylic acid, crotonic acid, itaconic acid, furmaric acid, maleic acid, citraconic acid, and/or the like. Other examples of monomers including the carboxylic acid group include monoalkylesters of unsaturated dicarboxylic acids. In an example, the monomer including the carboxylic acid group is present in the acrylic polymer in an amount ranging from about 6 wt % to about 25 wt % of the total wt % of the polymer, and in another example, is present in an amount ranging from about 8 wt % to about 18 wt % of the total wt % of the polymer.

Examples of vinyl aromatic compounds for the examples of the acrylic polymer include mono-functional vinyl aromatic compounds such as styrene, or alkyl-substituted styrenes (e.g., alpha-methylstyrene and chloro-substituted styrene such as chlorostyrene). In an example, the vinyl aromatic compound is present in the acrylic polymer in an amount ranging from about 5 wt % to about 45 wt % of the total wt % of the polymer, and in another example, is present in an amount ranging from about 10 wt % to about 25 wt % of the total wt % of the polymer.

Examples of esters of alpha, beta-ethylenically unsaturated acids for the examples of the acrylic polymer include esters of acrylic acid and methacrylic acid. Some specific examples include methyl methacrylate, ethyl acrylate, butyl acrylate, 2-ethylhexyl acrylate, dodecyl acrylate, ethyl methacrylate, lauryl methacrylate, N-butyl methacrylate, and 2-ethylhexylmethacrylate. In another example, the esters of alpha, beta-ethylenically unsaturated acids are mixtures of $C_1$ to $C_2$ alkyl esters and $C_4$ to $C_{20}$ alkyl esters, such as a mixture of methyl methacrylate and butyl acrylate. The ester(s) is/are present in the polymer in an amount ranging from about 5 wt % to about 80 wt % of the total wt % of the polymer, and in another example, in an amount ranging from about 30 wt % to about 70 wt % of the total wt % of the polymer.

In an example, the acrylic polymer may be made by mixing together an appropriate combination monomers identified above, and then polymerizing the monomers, e.g., by a free radical polymerization process. In this polymerization process, free radical initiators are used to initiate the polymerization, and examples of the free radical initiators include benzoyl peroxide, tertiarybutyl hydroperoxide, ditertiarybutyl peroxide, and azobis(2-methylpropionitrile). Polymerization may be accomplished in solution using a solvent in which the combination of monomers is soluble, and examples of solvents that may be used include toluene and xylene. After polymerization is complete, the mixture of polymerized monomers (now solid polymer particles) and solvent may be placed into a vacuum to remove the solvent.

It is to be understood that the acrylic polymer may also be made using other polymerization techniques, examples of which include emulsion polymerization, suspension polymerization, and/or bulk polymerization.

In another example, the polymeric binder having the high $T_g$ is commercially available, an example of which is JONCRYL® 89 (available from BASF Corp., Florham Park, N.J.). This polymeric binder is an acrylic polymer having a $T_g$ of about 98° C. Other examples of polymeric binders having a high $T_g$ that are commercially available and may be used in the examples of the fluid composition disclosed herein include other high $T_g$ binders of the JONCRYL® family, such as JONCRYL® ECO2189, JONCRYL® 2350, JONCRYL® LMV7051, JONCRYL® 2153, JONCRYL® HPD96, JONCRYL® 90, JONCRYL® 1610, and JONCRYL® DFC3025 (BASF Corp.), and high $T_g$ binders of the MORCRYL™ family, such as MORCRYL™ 132 and MORCRYL™ 350 (The Dow Chemical Corp., Midland, Mich.). All of these examples of the commercially available polymeric binder have a $T_g$ that is higher than 70° C.

Still other examples of the high $T_g$ polymeric binder include waterborne polyurethanes and waterborne hybrids of polyurethanes and acrylics.

In an example, the fluid composition may include a combination of the high $T_g$, anionic polymeric binder and another polymeric binder. The other polymeric binder is not limited by its $T_g$ so long as the fluid composition contains the high $T_g$ polymeric binder described above. In an example, the other polymeric binder is anionic. The other polymeric binder may be incorporated into the fluid composition to provide at least some adhesion of the fluid composition to the print upon which the fluid composition is to be applied. In some cases, the other polymeric binder may also impart some mechanical and/or optical properties to the fluid composition, e.g., scratch and/or rub resistance, enhancement in gloss, etc. In an example, the other polymeric binder may be chosen from polyurethanes, acrylic binders, or combinations thereof. Some specific examples of the other polymeric binder include waterborne acrylic binders (i.e., those that are water-transportable or water-soluble), styrene acrylics, styrene maleic anhydrides, polyurethane acrylics, and polyurethanes. Some specific examples of the other polymeric binder may include those chosen from the JONCRYL® family (such as, e.g., JONCRYL® 683), BASF Corp.; the CARBOSET® family and the SANCURE® family, Lubrizol Corp., Wickliffe, Ohio; and the ROSHIELD® family, the Dow Chemical Co., Midland, Mich. In an example, it may be desirable to select the other polymeric binder from the same family or from the same manufacturer as the high $T_g$ polymeric binder for compatibility reasons and/or purposes. For example, both the high $T_g$ and the other polymeric binder may be chosen from the JONCRYL® family.

In an example, the high $T_g$ polymeric binder is present in the fluid composition in an amount ranging, for example, from about 0.5 wt % to about 17 wt % of the total wt % of the fluid composition, and the other polymeric binder is present in the fluid composition in an amount ranging from about 1 wt % to about 3 wt %. In another example, the high $T_g$ polymeric binder is present in the fluid composition in an amount ranging from about 1 wt % to about 15 wt % of the fluid composition, and the other polymeric binder is present in the fluid composition in an amount ranging from about 1.5 wt % to about 2 wt %. In another example, the high $T_g$ polymeric binder is present in the fluid composition without the other polymeric binder. Further, the total amount of all of the polymeric binders present in the fluid composition (i.e., the high $T_g$ polymeric binder alone or in combination with the other polymeric binder) ranges from about 1 wt % to about 20 wt % of the total wt % of the fluid composition. In yet another example, the total amount of polymeric binder(s) in the fluid composition ranges from about 2 wt % to about 20 wt %. In still a further example, the total amount of polymeric binder(s) in the fluid composition ranges from about 2 wt % to about 10 wt %.

Again, the examples of the fluid composition are optically clear, and as such, none of the examples of the fluid composition includes a colorant. Accordingly, it is believed that a higher loading of the high $T_g$ polymeric binder and/or the other polymeric binder may be used in the examples of the fluid composition disclosed herein (as compared to inkjet inks including a colorant), and the examples of the fluid composition are still jettable from a thermal inkjet printhead. It is also believed that a higher loading of the polymeric binder(s) in the fluid composition will further improve the rub resistance of a print having the fluid composition deposited/applied thereon. In an example, the amount of polymeric binder in the fluid composition may be increased by at least 4 wt % (compared to the amount of binder in an inkjet composition including colorant) up to any value so long as the total binder loading in the fluid composition does not exceed about 20 wt % (i.e., the maximum polymeric binder loading that may be used in fluid compositions that are still jettable from an inkjet printer without clogging the nozzles of the inkjet printhead). In an example, the increase in the amount of the polymeric binder in the fluid composition is approximately the same loading of a colorant for most thermal inkjet ink formulations (e.g., about 4 wt %).

The wax particles to be dispersed in the aqueous vehicle are chosen from those having i) a high melting temperature $T_m$ and ii) a small average particle size. In an example, wax particles that have a high $T_m$ are those have a $T_m$ that is equal to or greater than 100° C. In an example, the $T_m$ of the wax particles for the examples of the fluid composition ranges from about 100° C. to about 150° C. In another example, the $T_m$ of the wax particles ranges from about 110° C. to about 135° C. Further, the wax particles have an average particle size (in terms of effective diameter assuming that the individual wax particles are not perfectly spherical) ranging from about 25 nm to about 75 nm. In another example, the wax particles have an average particle size of about 50 nm+/−10 nm. As previously mentioned, and without being bound to any theory, it is believed that wax particles having the high $T_m$ and the small average particle size will behave like a filler for a polymer film formed by the fluid composition when applied on a print. Some of the wax particles may also sit on the surface of the polymer film, and when dried, produce a textured, orange-peel-like surface. Again, this textured surface unexpectedly and advantageously contributes to the desirable improvement in the rub resistance of the product.

Some examples of the wax particles that may be incorporated into the examples of the fluid composition disclosed herein include polyethylene wax particles and modified paraffin wax particles. An example of polyethylene wax particles include high density polyethylene (HDPE) wax, which has a density ranging from about 0.93 g/mL to about 0.97 g/mL. The density of HDPE is generally higher than the density of low density polyethylene (LDPE) due, at least in part, to a smaller amount of molecular branching in HDPE. An example of modified paraffin wax particles include paraffin wax that has been modified to improve solubility in water, e.g., via emulsification. The modified paraffin wax particles may be surface modified, chemically modified, etc. Some specific examples of wax particles that may be used include those of the JONCRYL® Wax series (such as JONCRYL® Wax 22, JONCRYL® Wax 26, and JONCRYL® Wax 120 available from BASF Corp.), and those of the AQUACER® series (such as AQUACER® 498, AQUACER® 501, AQUACER® 505, AQUACER® 513, AQUACER® 535, AQUACER® 537, AQUACER® 539, and AQUACER® 552 available from BYK-Gardner, Columbia, Md.). The wax particles may also or otherwise be chosen from water-dispersed wax particles available from Micro Powders, Inc., Tarrytown, N.Y.

In an example, the fluid composition includes JONCRYL® Wax 26, which are wax particles having a $T_m$ of about 130° C. and an average particle size of about 50 nm.

Further, the wax particles may be present in the fluid composition in an amount ranging, for example, from about 0.3 wt % to about 6 wt % of the total wt % of the fluid composition. In another example, the wax particles may be present in an amount ranging from about 0.5 wt % to about 3 wt % of the total wt % of the fluid composition.

One example of the fluid composition of the present disclosure has the following formulation: about 1.5 wt % JONCRYL® 683 potassium salt (an acrylic polymeric binder); about 1.5 wt % JONCRYL® 89 (a high $T_g$ acrylic polymeric binder); about 4 wt % DANTOCOL® DHE (a humectant); about 2 wt % 2-pyrrolidone; about 0.65 wt % LEG-1; about 0.2 wt % SURFYNOL® CT-211 (a surfactant); about 0.2 wt % ZONYL® FSO (a fluorosurfactant); about 1.5 wt % JONCRYL® Wax 26 (wax emulsion); and the balance water.

The fluid composition may have, for example, a viscosity that is significantly lower than 100 centipoise (cP) so that the fluid composition can be jetted from a thermal inkjet pen. For instance, the thermal inkjet pen typically fires ink drops at a frequency of about 5 kHz to about 50 kHz, and at this frequency, the fluid composition having a low viscosity (e.g., lower than 10 cP) enables high speed refilling of the fluid at the firing chamber.

It is to be understood that the fluid composition having a low viscosity (e.g., lower than 50 cP) is also jettable from a piezoelectric inkjet pen.

In the examples of the fluid composition where the fluid composition is to be jetted from a thermal or a piezoelectric inkjet pen, the viscosity of the fluid composition ranges from about 0.5 cP to about 90 cP, and in another example, the viscosity of the fluid composition ranges from about 0.75 cP to about 75 cP. In still another example of the fluid composition to be jetted from a thermal or piezoelectric inkjet pen, the viscosity of the fluid composition ranges from about 1 cP to about 25 cP.

It is to be understood that the fluid composition may generally require a higher viscosity when the fluid is to be applied using a post processing device (e.g., a roll coater). In these instances, an example of the fluid composition has a viscosity ranging from about 65 cP to about 200 cP.

The examples of the fluid composition may be made by forming or providing the aqueous vehicle, and then dispersing or incorporating, in no particular order, the polymeric binder(s) and the wax particles in the vehicle. In some examples, the vehicle may be formed by mixing the additives (e.g., surfactant(s), etc.) in water. In other examples, the vehicle is formed by mixing the solvent(s)/co-solvent(s)/humectant(s) and the additive(s) in water. Further, when each of the polymeric binder(s) and the wax particles are purchased, the polymeric binder(s) and wax particles are then dispersed in the vehicle by adding the polymeric binder(s) and the wax particles to the vehicle, or visa versa. The solid-based components (e.g., the polymeric binder(s) and wax particles) and liquid-based components (e.g., the aqueous vehicle) of the instant example of the fluid composition are then mixed together. In instances where the high $T_g$ polymeric binder is not purchased, the method may then involve making the polymeric binder as previously described, and then dispersing each of the high $T_g$ polymeric binder, the other polymeric binder (if used), and the wax particles in the vehicle. The solid-based components and the liquid-based components of this example of the fluid composition are then mixed together.

The mixing of the components to form the examples of the fluid composition may be performed by ultrasonic mixing and/or mechanical mixing. One example of ultrasonic mixing includes ultrasonic agitation. Examples of mechanical mixing include high shear mechanical mixing, high pressure mixing, shaking, pumping, and/or the like, and/or combinations thereof. The mixing may be performed for any amount of time sufficient to completely/substantially completely disperse the polymeric binder(s) and the wax particles in the aqueous vehicle.

Also disclosed herein is a printing method, which involves depositing an ink onto a recording medium to form a print. Examples of the recording medium upon which the ink is to be deposited include any cellulose-based paper, i.e., paper that includes cellulose fibers. For instance, the recording medium may be made from pulp fibers derived from hardwood trees (e.g., deciduous trees (angiosperms) such as birch, oak, beech, maple, and eucalyptus) and/or softwood trees (e.g., coniferous trees (gymnosperms) such as varieties of fir, spruce, and pine, as for example loblolly pine, slash pine, Colorado spruce, balsam fir and Douglas fir), and these pulps may be prepared via any known pulping process. Further, the cellulose-based paper may include one or more fillers to control the physical properties of the medium. Examples of fillers include ground calcium carbonate, precipitated calcium carbonate, titanium dioxide, kaolin clay, silicates, and combinations thereof. It is to be understood that the cellulose-based paper may be referred to herein as plain paper.

Other examples of the recording medium include resin-coated papers (such as, e.g., photobase paper) and papers made from or including polyethylene (PE), polypropylene (PP), polyethylene terephthalate (PET), polylactic acid (PLA), and/or the like, and/or combinations thereof. In an example, the recording medium is formed from cellulose papers, papers including synthetic fibers, and/or any other papers suitable for use with a digital inkjet printer.

It is to be understood, however, that the examples of the fluid composition disclosed herein cannot suitably adhere to plastic mediums, metal mediums, and/or other mediums having metal films formed thereon. As such, none of these mediums can be used in combination with the fluid composition of the present disclosure.

Referring back to the printing method, when the ink is deposited, the ink forms an image on the medium, and the image may include, for example, photos, alphanumeric indicia, graphical indicia, or combinations thereof. In an example, the ink to be deposited on the medium is a water-based ink. It is believed that the examples of the fluid composition disclosed herein may be deposited on an oil-based ink and/or a toner, e.g., if the image formed by the oil-based ink and/or the toner is a light-density image, such as text. Then, the fluid composition is deposited/applied on the print (e.g., at least over the ink/image) to form a coating on the print. In an example, the inked portions of the medium alone are coated with the fluid composition. In another example, the entire surface of the medium is coated with the fluid composition. Further, the fluid composition is applied on the print in an amount sufficient to produce a coating layer or film having a thickness that allows the print to exhibit the improved print durability. In an example, the coating layer or film has a thickness ranging from about 0.1 μm to about 6 μm. In yet another example, the coating layer has a thickness ranging from about 0.5 μm to about 3 μm.

In an example, the depositing/application of the ink and the depositing/application of the fluid composition are each performed by thermal inkjet printing. As used herein, the term "inkjet printing" refers to non-impact methods for producing images by the deposition of ink/fluid droplets in a pixel-by-pixel manner onto an image-recording medium in response to appropriate commands, such as digital signals. Further, printers that use thermal inkjet printing methods to deposit both the ink and the fluid composition are those that are configured to eject a droplet of the ink or the fluid from respective chambers housed in the printer when a pulse of current is passed through a heating element causing a rapid vaporization of the ink and/or of the fluid in the chamber to form a bubble. This causes a large pressure increase that propels a droplet of the ink or the fluid onto the medium. One example of a printer that uses thermal inkjet printing methods is a digital thermal inkjet printer. It is believed that the examples of the fluid composition disclosed herein may be printed from digital inkjet printers, including those that operate at printing speeds up to about 1000 ft/min.

In another example, the depositing/application of the ink and the depositing/application of the fluid composition may both be performed by piezoelectric inkjet printing. Printers that use piezoelectric inkjet printing methods to deposit both the ink and the fluid composition are those that are configured to eject a droplet of the ink or the fluid from respective chambers housed in the printer when a voltage is applied to a piezoelectric material. The piezoelectric material is located proximate to an ink chamber that is in fluid communication with the nozzle of a printhead. When the voltage is applied, the piezoelectric material changes shape (which in some printers causes other components, such as a membrane, to deform), which generates a pressure pulse in the ink/fluid that forces a droplet of ink/fluid from the nozzle.

In an example, some examples of the fluid composition may be deposited onto a print using the same printer that was used to form the image. In this example, the examples of the fluid composition having a low viscosity may be contained in a fluid reservoir (e.g., cartridge) onboard the printer. An ink, or a plurality of inks (e.g., an ink set), may be contained in another fluid reservoir(s) (e.g., cartridge(s)) onboard the printer. The ink may be deposited onto the medium to form the print by retrieving the ink from its respective fluid reservoir and jetting the ink onto a medium from an inkjet printhead (either onboard the printer or the cartridge). In one example, the fluid composition is then deposited onto the print (e.g., over the image formed by the depositing of the ink on the medium) by retrieving the fluid composition from its respective fluid reservoir, and then jetting the fluid composition, from the printhead of the printer or the cartridge, at least on the ink of the print. In another example, the fluid composition is deposited onto the print (e.g., over the image formed by the depositing of the ink on the medium) by retrieving the fluid composition from its respective fluid reservoir, and then jetting the fluid composition, from another printhead onboard the printer, at least on the ink of the print. As such, the ink and fluid composition may be printed using different printheads or may be printed using the same printhead when the ink and fluid are drawn from different chambers/reservoirs.

In another example, some examples of the fluid composition may be applied onto a print using a post processing device. In this example, the examples of the fluid composition having a higher viscosity may be contained in a fluid reservoir onboard the post processing device, or may be supplied to the post processing device at the time of use. The print, again which was formed by printing an ink onto the medium, may be fed into or put into contact with the post processing device. In one example, upon receiving the print, the post processing device will retrieve the fluid composition (e.g., from a fluid reservoir), and then apply the fluid composition to the print. The post processing device may employ thermal inkjet printing methods to deposit the fluid composition onto the print. In another example, the post processing device may employ other methods, such as roll coating. In this example, the roll coater may be coated with the fluid composition, and then put into contact with the print, thereby transferring the fluid composition from the roll coater to the print.

Also disclosed herein is a printed article 100 shown in FIG. 3. The printed article 100 includes a print 102 (which includes the recording medium 104 and an ink (shown as a layer 106) applied on the recording medium 104), and the optically clear fluid composition (shown as a film 108 in FIG. 3) applied at least on the ink layer 106. The printed article 100 may be formed using any of the example methods described above, and the recording medium 104 may be chosen from any of the example recording mediums identified above. Further, and in an example, the ink that is applied to the recording medium 104 to form the print 102 is a water-based ink.

It is to be understood that the examples of the optically clear fluid composition described herein are fluids to be applied over ink printed on a recording medium. As such, the example optically clear fluids are not a component of the recording medium itself. For example, the optically clear fluid composition examples disclosed herein are not used as a coating layer of a paper recording medium (e.g., a topcoat) during the paper production. It is further to be understood that the examples of the fluid composition cannot be used as such a coating layer during production of a recording medium, in part because the fluid composition would change the surface properties of the medium, e.g., the porosity of the medium and the hydrophobicity/hydrophilicity of the medium. Further, the wax particles of examples of the fluid composition, if used as a topcoat during production of a recording medium, will impart a waxy film to the medium. This waxy film may block fiber voids on the surface of the medium. As such, if an ink were to be subsequently printed on the recording medium, the ink would not adhere well to the waxy film, and the image may be easily rubbed off.

To further illustrate the present disclosure, examples are given herein. It is to be understood that these examples are provided for illustrative purposes and are not to be construed as limiting the scope of the disclosed example(s).

EXAMPLES

Two optically clear overcoat fluid compositions were prepared (Fluid Composition A and B). The Fluid Compositions A and B were both used in Examples 1 and 2 below, and a variation of Fluid Composition B was used in Example 3. The formulation of Fluid Compositions A and B are provided in Table 1 below:

TABLE 1

| Formulation of Fluid Compositions A and B | | | |
|---|---|---|---|
| Fluid Component | Tradename/Chemical Name | Fluid Composition A (wt %) | Fluid Composition B (wt %) |
| Acrylic urethane polymeric binder with low $T_g$ | LUCIDENE ® 645 | 1.5 | 0 |
| Acrylic binder | JONCRYL ® 683 | 1.5 | 1.5 |
| Acrylic binder with high $T_g$ | JONCRYL ® 89 | 0 | 1.5 |
| Co-solvents | DANTOCOL ® DHE, 2-pyrrolidone, and LEG-1 | 6.65 | 6.65 |
| Surfactant | SURFYNOL ® CT-211 | 0.1 | 0.19 |
| Fluorosurfactant | ZONYL ® FSO | 0.1 | 0.2 |
| Wax particles | JONCRYL ® Wax 26 | 0 | 1.5 |
| Water | water | Balance | Balance |

Example 1

Three products were formed by i) printing an ink onto the surface of a paper medium to form a print which is identified herein as Product 1, ii) printing an ink onto the surface of a paper medium to form a print, and then printing Fluid Composition A over the print to form Product 2, or iii) printing an ink onto the surface of a paper medium to form a print, and then printing Fluid Composition B over the print to form Product 3. The prints for Products 1, 2, and 3 were all formed by printing an inkjet ink onto STERLING® Ultra Gloss 80# paper (NewPage Corp., Miamisburg, Ohio), and the printing of the ink and of the Fluid Compositions A and B were all accomplished using an HP Officejet Pro K550 (Hewlett-Packard Co., Houston, Tex.).

A rub resistance test was performed on Products 1, 2, and 3. The rub resistance test was performed utilizing a TMI Rub Tester Model No. 10-18-01-0001 (Testing Machines, Inc., New Castle, Del.). The rub tester was operated at a rub weight of about 2 lbs, and at a speed of about 100 rpm. Rub testing was performed about 48 hours after Products 1, 2, and 3 were formed, and images of the Products 1, 2, and 3 were taken after 10 cycles of rub testing.

Figure 1B:
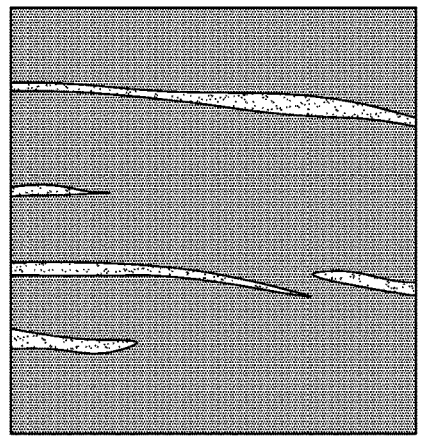
FIG. 1B is a representation of an image of a product formed by depositing an ink on a recording medium, and then depositing an optically clear fluid composition on the ink, where the solid-based components of the fluid composition include a polymeric binder having a glass transition temperature ($T_g$) of about −22° C. and wax particles, and where the product was exposed to 10 cycles of dry rubbing.
Figure 1C:
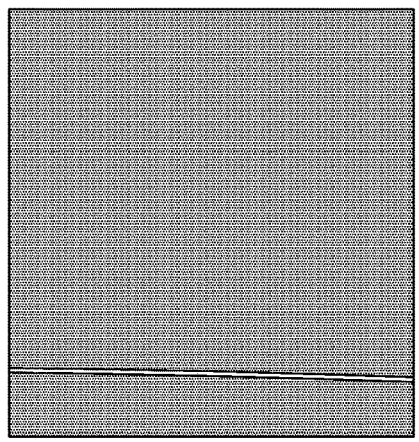
FIG. 1C is a representation of an image of a product formed by depositing an ink on a recording medium, and then depositing an optically clear fluid composition, according to an example of the present disclosure, on the ink, where the solid-based components of the fluid composition include a polymeric binder having a $T_g$ of about 98° C. and wax particles, and where the product was exposed to 10 cycles of dry rubbing.

Representations of the images for Products 1, 2, and 3 are shown in FIGS. 1A, 1B, and 1C, respectively. The image for Product 3 (which was formed utilizing Fluid Composition B as the overcoat composition) showed no rub marks, which is unlike the respective images for Product 1 (where no fluid composition was applied) and Product 2 (where Fluid Composition A was applied, which contained a low $T_g$ polymeric binder and thus was a comparative composition). These results demonstrate that Product 3 has a much higher rub resistance than Products 1 and 2.

Example 2

Products 1, 2, and 3 were also subjected to a scratch resistance test. The scratch resistance test was performed using a 1.5 kg loaded stylus drawn on Products 1, 2, and 3 using the ASTM (f.k.a. the American Society for Testing and Materials) D 7187 standard test guide. The scratch resistance test was performed about 48 hours after Products 1, 2, and 3 were formed.

The results of the scratch test are summarized in Table 2 below:

TABLE 2

Results of Scratch Resistance Test

|  | Product 1 | Product 2 | Product 3 |
| --- | --- | --- | --- |
| Scratch Resistance | Poor | Best | Best |

The results shown in Table 2 were determined by visual observation of Products 1, 2, and 3. The product (i.e., Product 1) having a "poor" scratch resistance rating included vertical white lines where the ink film (i.e., the image of the print) was scratched off by the stylus. The products (i.e., Products 2 and 3) having a "best" scratch resistance rating did not have any vertical white lines scratched off by the stylus and did not have any blemishes, e.g., on any portion of the image formed on the paper. From the results in Table 2, the scratch resistance of Products 2 and 3 are about the same, and the scratch resistance of both of these products is better than the scratch resistance of Product 1.

Example 3

Two more products were formed by i) printing an ink onto the surface of a paper medium to form a print which is identified herein as Product 4, or ii) printing an ink onto the surface of a paper medium to form a print, and then printing Fluid Composition C over the print to form Product 5. Fluid composition C had the same composition as Fluid Composition B except that the composition included 1 wt % of the wax particles instead of the 1.5 wt % noted in Table 1. The prints for Products 4 and 5 were both formed by printing an inkjet ink onto STERLING® Ultra Gloss 80# paper (NewPage Corp.), where the printing of the ink and of the Fluid Composition C were both accomplished using an HP Officejet Pro K550 (Hewlett-Packard Co.).

Products 4 and 5 were subjected to scratch resistance tests. The scratch test was performed on Product 4 using a 1.5 kg and a 2 kg loaded stylus, both of which were drawn on Product 4 using the ASTM D 7187 standard test guide. The scratch test was performed on Product 5 using the 1.5 kg loaded stylus, which was also drawn on Product 5 using the ASTM D 7187 standard test guide. The scratch resistance tests were performed about 48 hours after Products 4 and 5 were formed.

FIG. 2A is a representation of an image of Product 4, and the image showed a scratch mark (i.e., the vertical white line) produced using the 1.5 kg stylus and another scratch mark (i.e., another vertical white line) produced using the 2 kg stylus. FIG. 2B is a representation of the image of Product 5 (again, which was produced by printing Fluid Composition C on the print), and the image showed no scratch mark produced by the 1.5 kg stylus.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 25 nm to about 75 nm should be interpreted to include not only the explicitly recited limits of about 25 nm to about 75 nm, but also to include individual values, such as 30 nm, 45 nm, 62 nm, etc., and sub-ranges, such as from about 25 nm to about 50 nm, from about 35 nm to about 65 nm, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

What is claimed is:

1. An optically clear fluid inkjet composition, comprising:
an aqueous vehicle;
an anionic polymeric binder dispersed in the aqueous vehicle, the anionic polymeric binder having a glass transition temperature ($T_g$) that is higher than 40° C., and a pH ranging from about 7 to about 11, wherein the anionic polymeric binder is present in an amount ranging from about 0.5 wt % to about 17 wt % of a total weight of the optically clear fluid inkjet composition;
an other polymeric binder present in an amount ranging from about 1 wt % to about 3 wt % of a total weight of the optically clear fluid inkjet composition, the other polymeric binder being selected from the group consisting of polyurethane acrylics and polyurethanes; and
wax particles incorporated in the aqueous vehicle, the wax particles having a particle size ranging from about 25 nm to about 75 nm, and a melting temperature ($T_m$) ranging from about 100° C. to about 150° C.;
wherein the optically clear fluid inkjet composition has a viscosity ranging from about 0.5 centipoise to about 90 centipoise;
and wherein a total amount of polymeric binder in the optically clear fluid inkjet composition, including the anionic polymeric binder and the other polymeric binder, ranges from about 1.5 wt % to about 20 wt % of the total weight of the optically clear fluid inkjet composition.

2. The optically clear fluid inkjet composition as defined in claim 1 wherein the viscosity of the optically clear fluid inkjet composition ranges from about 1 centipoise to about 25 centipoise.

3. The optically clear fluid inkjet composition as defined in claim 1 wherein the aqueous vehicle includes one of i) water or ii) water and a solvent, the solvent being present in the optically clear fluid inkjet composition in an amount ranging from about 2 wt % to about 30 wt % of the total weight of the optically clear fluid inkjet composition.

4. The optically clear fluid inkjet composition as defined in claim 3 wherein the optically clear fluid inkjet composition further includes a surfactant present in an amount ranging from about 0.01 wt % to about 2.5 wt % of the total weight of the optically clear fluid inkjet composition.

5. The optically clear fluid inkjet composition as defined in claim 4 wherein i) the combination of the anionic polymeric binder and the other polymeric binder and ii) the wax particles are present in the optically clear fluid inkjet composition in a ratio of about 3:1.5, and wherein the wax particles produce a textured surface on a medium when the optically clear fluid inkjet composition is printed on the medium.

6. The optically clear fluid inkjet composition as defined in claim 1 wherein the anionic polymeric binder is chosen from acrylic polymers having a $T_g$ that is higher than 40° C., waterborne polyurethanes having a $T_g$ that is higher than 40° C., and waterborne hybrids of polyurethanes and acrylic polymers where the waterborne hybrids have a $T_g$ that is higher than 40° C.

7. The optically clear fluid inkjet composition as defined in claim 1 wherein the anionic polymeric binder has a molecular weight ranging from 2,000 to 200,000, and has an acid number ranging from about 10 to about 200.

8. The optically clear fluid inkjet composition as defined in claim 1 wherein the wax particles are chosen from high density polyethylene wax particles and modified paraffin wax particles.

9. The optically clear fluid inkjet composition as defined in claim 1 wherein:
the wax particles are present in an amount ranging from about 0.3 wt % to about 6 wt % of the total weight of the optically clear fluid inkjet composition.

10. The optically clear fluid inkjet composition as defined in claim 1 wherein the density of the wax particles is about 0.99 g/mL, and the density of the anionic polymeric binder is about 1.11 g/mL.

11. An optically clear fluid inkjet composition, comprising:
an aqueous vehicle including:
a co-solvent combination consisting of a hydantoin glycol, 2-pyrrolidone, and glycereth-26;
a surfactant; and
a balance of water;
an anionic polymeric binder dispersed in the aqueous vehicle, the anionic polymeric binder having a glass transition temperature ($T_g$) that is higher than 40° C., and a pH ranging from about 7 to about 11, wherein the anionic polymeric binder is present in an amount ranging from about 0.5 wt % to about 17 wt % of a total weight of the optically clear fluid inkjet composition; and
wax particles incorporated in the aqueous vehicle, the wax particles having a particle size ranging from about 25 nm to about 75 nm, and a melting temperature ($T_m$) ranging from about 100° C. to about 150° C.;
wherein the optically clear fluid inkjet composition has a viscosity ranging from about 0.5 centipoise to about 90 centipoise;
and wherein a total amount of polymeric binder in the optically clear fluid inkjet composition, including the anionic polymeric binder, ranges from about 1 wt % to about 20 wt % of the total weight of the optically clear fluid inkjet composition.

12. The optically clear fluid inkjet composition as defined in claim 11 wherein:
the co-solvent combination is present in an amount of about 6.65 wt % of the total weight of the optically clear fluid inkjet composition; and
the surfactant is present in an amount of about 0.4 wt % of the total weight of the optically clear fluid inkjet composition, and includes a combination of a fluoro-surfactant and an alkylphenylethoxylate.

13. The optically clear fluid inkjet composition as defined in claim 11 wherein the anionic polymeric binder, the other polymeric binder, and the wax particles are each present in an amount of about 1.5 wt %.

14. A printed article, comprising:
a print, including:
a recording medium; and
an ink applied to the recording medium; and
the optically clear fluid inkjet composition of claim 1 applied at least on the ink.

15. The printed article as defined in claim 14 wherein the recording medium is chosen from cellulose-based papers, resin-coated papers, papers made from or including one of polyethylene (PE), polypropylene (PP), polyethylene terephthalate (PET), and polylactic acid (PLA); and papers including synthetic fibers.

16. A printing method, comprising:
depositing an ink onto a medium to form a print; and
depositing, via inkjet printing, an optically clear fluid inkjet composition onto the print to form a product, the optically clear fluid inkjet composition including:
an aqueous vehicle;
an anionic polymeric binder dispersed in the aqueous vehicle, the anionic polymeric binder having a glass transition temperature ($T_g$) that is higher than 40° C., and a pH ranging from about 7 to about 11, wherein the anionic polymeric binder is present in an amount ranging from about 0.5 wt % to about 17 wt % of a total weight of the optically clear fluid inkjet composition;
an other polymeric binder present in an amount ranging from about 1 wt % to about 3 wt % of a total weight of the optically clear fluid inkjet composition, the other polymeric binder being selected from the group consisting of polyurethane acrylics and polyurethanes; and
wax particles having a particle size ranging from about 25 nm to about 75 nm, and a melting temperature ($T_m$) ranging from about 100° C. to about 150° C.;
wherein a total amount of polymeric binder in the optically clear fluid inkjet composition, including the anionic polymeric binder and the other polymeric binder, ranges from about 1.5 wt % to about 20 wt % of the total weight of the optically clear fluid inkjet composition; and
drying the product at a temperature up to 120° C.

17. The printing method as defined in claim 16 wherein the product exhibits improved rub resistance compared to an other product formed by depositing an other fluid composition on an other print, where the other fluid composition includes: an other anionic polymeric binder having a $T_g$ that is lower than 23° C.; the other polymeric binder; the polyethylene wax particles having a particle size ranging from about 25 nm to about 75 nm; the co-solvent; the surfactant; and water.

18. The printing method as defined in claim 16 wherein the ink and the optically clear fluid inkjet composition are individually contained in respective fluid reservoirs onboard a digital inkjet printer, and wherein:
the depositing of the ink is accomplished by retrieving the ink from one of the fluid reservoirs, and then jetting the ink from a printhead of the digital inkjet printer onto the medium to form the print; and
the depositing of the optically clear fluid inkjet composition is accomplished by retrieving the optically clear fluid inkjet composition from an other of the fluid reservoirs, and then jetting the optically clear fluid inkjet composition from i) the printhead of the digital inkjet printer onto the print or ii) an other printhead of the digital inkjet printer onto the print.

19. The printing method as defined in claim 16 wherein the optically clear fluid inkjet composition is contained in a fluid reservoir of a post processing device, and wherein the depositing of the optically clear fluid inkjet composition is accomplished by:

retrieving the optically clear fluid inkjet composition from the fluid reservoir; and applying the optically clear fluid inkjet composition onto the print previously fed into the post processing device.

20. The printing method as defined in claim 16 wherein the density of the wax particles is about 0.99 g/mL, and the density of the anionic polymeric binder is about 1.11 g/mL.

* * * * *